Sept. 24, 1968   J. N. JACOBS   3,402,751
NON-SKID TIRE TREAD
Filed March 21, 1966
Fig.1.
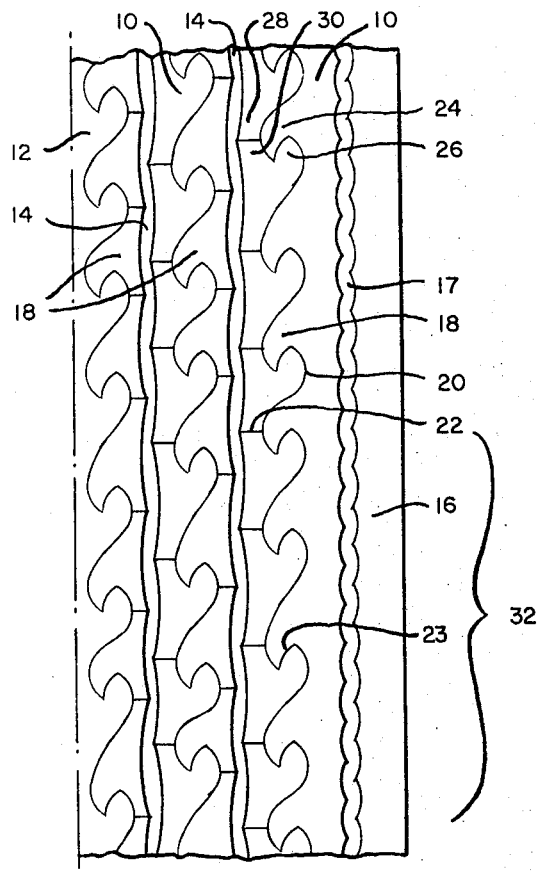
Fig.2.
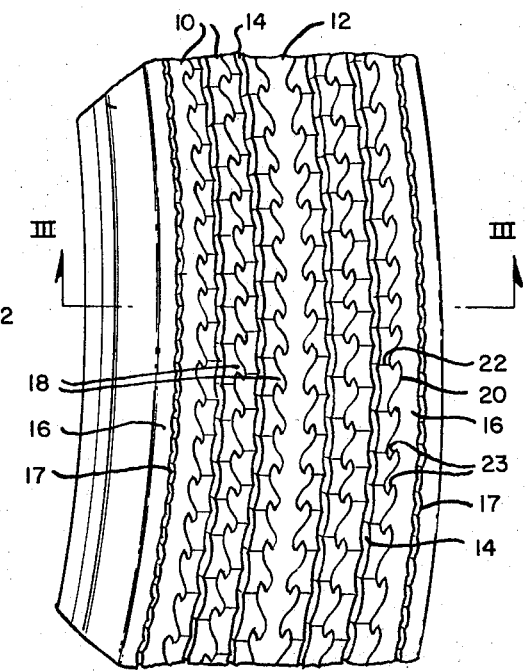
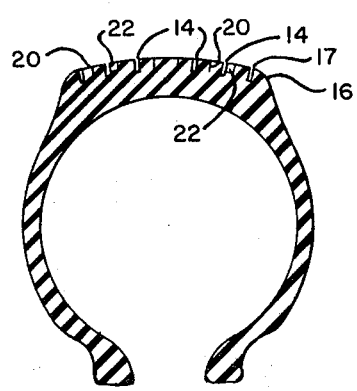
Fig.3.
INVENTOR
Joseph N. Jacobs
his Attorneys United States Patent Office 3,402,751
Patented Sept. 24, 1968

3,402,751
NON-SKID TIRE TREAD
Joseph N. Jacobs, Indiana, Pa., assignor to McCreary Tire and Rubber Company, Indiana, Pa., a corporation of Pennsylvania
Filed Mar. 21, 1966, Ser. No. 535,856
12 Claims. (Cl. 152—209)

ABSTRACT OF THE DISCLOSURE

A vehicular tire is disclosed having a tread arrangement including arcuate or sinusoidal siping arrangements. Water entrapped in the siping is swirled owing to the shape of the siping and is eliminated by transverse sipes connecting the arcuate siping with adjacent circumferential grooves. Elimination of road water in this manner minimizes hydroplaning when the road surface is covered with a water film. The siping arrangements also are arranged to form road-gripping asperities which improve the anti-skid characteristic of the tire.

---

The present invention relates to elastomer vehicle tires, and more particularly to tires of the character described having tread means associated therewith for minimizing skidding under all road conditions. The invention is particularly directed to anti-hydroplaning and anti-skid tread means for such tires.

Since the advent of self-propelled vehicles and especially the development of pneumatic tires therefor, numerous tread means have been proposed for tires employed on such vehicles. Such conventional tread means, however, have been far from satisfactory under many road conditions. Specifically, such tread means have not heretofore provided adequate anti-skid and anti-hydroplaning characteristics under appropriate road conditions.

Assuming a pavement is covered with a water film and the vehicle speed is high, the tires thereof can be deflected by their impact on the water layer. This permits the formation of a fluid wedge at the tire contact patch or footprint which at high speeds can be of sufficient length to completely separate the tire from the pavement. There are eight manifestations of tire hydroplaning which have been experimentally observed. They are as follows: (1) detachment of tire footprint, (2) hydrodynamic ground pressure, (3) spin down of wheel, (4) suppression of tire low wave, (5) scouring action of escaping fluid in tire-ground footprint region, (6) peaking of fluid displacement drag, (7) loss in braking traction and (8) loss of tire directional stability.

Proper anti-skid characteristics have not been hitherto obtained particularly on wet road surfaces where the vehicle tires exhibit the well-known hydroplaning tendencies which, of course, reduce the frictional engagement of the tire with the wet road surface, in addition to the lubricating tendencies of the water films. Thus, conventional tire tread means have not been enabled properly to break-up and to expel the fluids which normally tend to become entrapped between the tire and the road surfaces. More importantly, the lack of adequate anti-skid and anti-hydroplaning characteristics in conventional tire tread means renders the tires still less satisfactory and, therefore, more dangerous to operational safety, when the tires are subject to various degrees of yaw in either the left or the right directions.

In order to overcome the undesirable effects of hydroplaning and to improve the frictional engagement of the tire with the road surface, it is desirable to provide means associated wtih the tire tread for imparting a swirl-type or serpentine motion to fluid entrapped between the tire and road surfaces, to prevent formation of the aforementioned fluid wedges. It has been found that the hydroplaning tendencies of such vehicular tires are considerably reduced with the provision of tread means having non-linear configurations which induce the aforementioned swirling or serpentine actions, and which provide numerous escape routes for the road fluids.

In accordance with the invention, the aforementioned swirling and serpentine actions occasioned during revolution of the tire are induced by tread means having a repetitive arcuate or substantially oscillatory configuration. Such configurations swirl and expel in all directions the fluid entrapped between the tire and the road surfaces. In another feature of the disclosed tire, cooperative tread means are provided for forming a series of asperities which immediately penetrate and aid in swirling the fluid films. Still other tread means are associated with the tire arrangement of the invention to permit the escape of fluids entrapped and stored by the oscillatory tread configurations, and to provide additional anti-skid asperities. The shape of the arcuate tread means and the swirling action of the entrapped fluids causes the fluid to be quickly expelled in all directions from the tread means and footprint area or that portion of the road surface engaged by the tire. The tread means of the invention is so shaped that compressive and other forces applied to the tread means at the contact patch will not close the fluid escape routes thereof, either under normal tracking or when the tire is subjected to left or right yaw forces during turning or either lateral or track skidding.

In one arrangement of the invention, the aforementioned asperities include a series of relatively reversed pairs of peaks or relatively sharp tread edges of arcuate configuration associated with the novel tread means to serve as fluid dividers which break up the fluid films at a relatively large number of points and disperse the fluid in all directions to facilitate its removal or expulsion from the footprint area. Such peaks desirably are shaped to have interrelating action with the oscillatory portion of the tread means and thus aid in providing continuous traction and antihydroplaning tire characteristics.

In addition, spacing means are readily associated with the respective portions of the tread means of the invention to prevent simultaneous engagement of the tread asperities and harmonic build-up of tread noise. Thus, the tread means of the invention is readily arranged for the production of a noiseless tire tread construction.

During the foregoing discussion, numerous objects, features and advantages of the invention have been alluded to. These and other objects, features and advantages of the invention will be elaborated upon during the forthcoming description of certain presently preferred embodiments of the invention together with preferred methods of practicing the same.

In the accompanying drawings, I have illustrated certain presently preferred embodiments of the invention together with preferred methods of practicing the same, wherein:

FIGURE 1 is a top plan view of a portion of a tire tread of the invention;

FIGURE 2 is an isometric view of a portion of a pneumatic tire embodying the tread means shown in FIGURE 1; and FIGURE 3 is a cross-sectional view of the pneumatic tire shown in FIGURE 2 and taken along reference line II—II thereof.

Referring now more particularly to FIGURES 1 and 2 of the drawings, the exemplary arrangement of the tread means and tire illustrated therein includes a plurality of circumferentially extending substantially continuous, siped ribs 10 together with a centrally disposed circumferential rib 12. In this arrangement five such ribs are employed as part of the tread means although it will be understood that the number can be varied as dictated by a given application or size of the tire. The ribs 10 and 12 in this example are separated by circumferentially extending grooves 14 disposed respectively therebetween. The grooves 14 likewise can be varied with the number of the ribs 10 or 12 continuously about the outer periphery ranged symmetrically on either side of the tread center line 15. At the lateral edges respectively of the tire, as better shown in FIGURE 2, suitable rounded shoulder ribs 16 are formed by additional circumferential grooves 17 in accordance with another feature of the invention. The latter ribs are not provided with siping, in this example. The rounded shoulder ribs aid in maintaining traction during cornering operations of the vehicle, and thus in general enhance the anti-skid tire characteristics under various yaw conditions.

In accordance with the invention, each rib 10 or 12 is provided with an arcuate siping arrangemnt for the purpose of swirling and expelling in all directions the fluids which otherwise would be entrapped between the tire and road surfaces, particularly when the tire encounters wet road surfaces. Such siping arrangement desirably is of oscillatory or reversely arcuate configuration and additionally is constructed to provide drainage of fluids trapped therein to the aforementioned circumferential grooves 14. The siping arrangement in one form of the invention produces reversely directed pairs of arcuate peaks or asperities which additionally aid as fluid dividers in breaking-up and dispersing fluid films. The aforementioned asperities together with the siping arrangement considerably improve the anti-skid and anti-hydroplaning characteristics of the tire of the invention.

One form of such siping arrangement is designated in the drawings by the reference characters 18, and is associated with each of the circumferential ribs 10 or 12. In this example of the invention, each of the siping arrangements 18 includes a series of arcuate or sinusoidal sipes 20 which are repetitively formed in each of the ribs 10 or 12 continuously about the outer periphery thereof. The sipes 20, which in this example are reversely curved, together with other portions of the siping arrangement 18 are in effect slits or cuts in the elastomer forming the tread. In practice, the siping can be formed in the conventional manner by employing very thin fins of suitable configuration in the tire mold.

As the sipes 20 enter the footprint area of the tire, their arcuate or non-linear configuration imparts a swirling action to the fluids to expel the fluids from the footprint area which would otherwise be normally entrapped therebetween. Continuity of such action is preserved by transversely extending sipes 22 which couple or connect each of the sipes 20 to an adjacent one of the circumferential grooves 14 with the relatively short transverse connecting sipes 22 permitting fluid to be forced therethrough by compressed air or fluids from the swirling sipes 20 to the adjacent one of the grooves 14. In furtherance of this purpose the transverse sipes desirably are extended from at least one of those portions of each sinusoidal sipes 20 which lie nearest an adjacent circumferential groove 14. The arcuate configuration of the sipes 18, and particularly the reversing or oscillatory character thereof keeps road fluids moving in them as different parts of the tire tread are compressed or otherwise flexed.

Thus, the swirling sipes 20 are maintained in clean and operable condition. As the rotation of the tire proceeds, each of the sipes 20 are prepared to absorb more of the fluid film upon re-entry into the footprint area. The non-linear configuration of the sipes 20 also permits the siping arrangement 18 to remain functional at optimum efficiency under various degrees of yaw, in either the right or left directions, which may be applied to the tire during turning operations or skidding of the vehicle. The fluids drained from the siping 18 to the grooves 14 of course are freely eliminated as the tire revolves. Additional transverse sipes (not shown) can be used to connect the outermost rows of sipes 20 with the shoulder grooves 17 respectively, if desired. The latter sipes are omitted in this example due to the rounded shoulder contours better shown in FIGURE 3.

The function of siping is, of course, to provide a large number of relatively sharp edges upon the tire tread surfaces. As the tire rolls, it deforms in the footprint area and the adjacent areas of the siping become slightly offset to enhance the anti-skid properties of the tire. As seen in the drawings, each of the reversely curved sipes 20 are of substantially symmetrical configuration, in this example. The reversely curved configuration of the sipes 20 enhances the expelling and swirling action of the arcuate surfaces upon the fluid films, in accordance with the present understanding of the invention. However, such action is enhanced still further by the provision of connecting or re-entrant sipes 23 between the adjacent spaced ends of the sipes 20. In this arrangement, each of the connecting sipes 23 defines a pair of relatively reversely directed arcuate asperities 24 and 26, with pairs of such asperities extending around each of the ribs 10 or 12. The pairs of reversed peaks or asperities 24, 26 serve as fluid dividers, as they enter the footprint area to immediately break-up the fluid films or wedges and to swirl and disperse the fluids which would otherwise be entrapped between the tire and road surfaces. Because of the arcuate configuration, the asperities disperse road fluids in all directions. The reversed character of the asperities 24, 26 will, of course, be operable independently of the rotational direction of the tire. Since the siping arrangement 18 and the asperities 24, 26 defined thereby permit immediate penetration of the fluid films as each pair of asperities enter the footprint area, the anti-hydroplaning characteristics of the tire and tread means of the invention are greatly enhanced, in accordance with the present understanding. As set forth above, the removed portions of the fluid films are readily conducted out of the siping arrangements 18 by their transverse sipes 22. Moreover, the non-linear contours of the siping arrangements 18 and of the asperities 24, 26 also improve the anti-skid characteristics of the tire when used on any type of road surface and under all yaw conditions.

As better shown in FIGURES 2 and 3, the central rib 12, in this example of the invention, is substantially wider than the remaining siped ribs 10 and is provided with two rows of siping 18. The fluids absorbed by two central rows of siping 18 are immediately passed laterally to the respectively adjacent pair of the circumferential grooves 14. Thus, road fluids are rapidly removed from the central footprint area of the tire to impede further the development of fluid wedges and hydroplaning. The broader central rib 12 also improves dry traction.

Additional reversely directing pairs of asperities 28 and 30 are formed by each of the transversely extending sipes 22 in each of the siping arrangements 18. The asperities 28 and 30 provide additional anti-skid engagement of the tire with the road surface. In furtherance of this purpose, the walls of the grooves 14 in the areas of the transverse sipes 22 are extended slightly inwardly of the grooves 14, i.e., away from the adjacent portions of the arcuate sipes 18 to which the transverse sipes 22 are connected. This undulating characteristic of grooves 14 increases the lateral lengths of the asperities 28, 30 created by the sipes 22 and lengthens the asperities in the the transverse direction. Desirably, the groove walls are "peaked" as denoted by reference characters to sharpen the adjacent end portions 29, 31 of the asperities.

In accordance with another feature of the invention, each siping arrangement 18 can be sub-divided into groups of the sipes 20, including associated ones of the sipes 22 and 23, as denoted by bracket 32 with at least some of the sipes 20 in each bracketed group 32 being of different circumferential lengths. The groups of sipes represented by the bracket 32 of a given siping arrangement on one of the ribs 10 or 12 can be circumferentially displaced relative to similar groupings in others of the siping arrangements 18 in order to minimize harmonic build-up and tread noises.

Preliminary road tests and tests in Dry Ice have demonstrated that the tire of the invention has definite merit in comparison with conventional tire tread configurations. In all tests, the tire disclosed herein has been compared with the averaged performance of five varied conventional tread designs.

In the Dry Ice tests, comparison figures for both the tire of the invention and the several conventional tread designs are related to the performance of a control tire. In every test the tire of the invention averaged better than any one or all of the conventional tread designs.

A series of panic stop tests conducted at speeds between 20 and 25 m.p.h. on a wet, smooth macadam test strip indicated an average rating of 118% and 120% for the tire of the instant invention, based on an averaged rating of 100% for the conventional tires. A similar series of tests at 35 m.p.h. provided average rating of 108% based upon 100% for the aforementioned conventional tires.

A number of dynamometric traction or drawbar tests conducted under similar road conditions at 15 m.p.h. indicated an average rating of 106% for the disclosed tire, as compared to a rating of 100%, representing a performance average of the aforementioned conventional tires.

A series of Dry Ice dynamic traction tests indicated average ratings of 123% to 152% for the tire of the invention under various controlled traction conditions. The foregoing ratings are based upon an average rating of 100% for a control tire under the same traction conditions. The aforementioned conventional tires when similarly tested yielded average ratings, based on the control tire, of 92.2% to 109.2% under the same conditions.

In view of the foregoing, it will be apparent that novel and efficient forms of tire and tire tread means have been disclosed herein, which exhibit greatly enhanced antiskid and anti-hydroplaning characteristics particularly on wet road surfaces. However, such novel tread means provide greatly improved results on all road surfaces. Although a particular form of non-linear or arcuate siping configuration has been illustrated herein, it will be apparent that such configuration can be varied considerably within the teachings of the invention. Accordingly, while I have shown and described certain presently preferred embodiments of the invention and have illustrated preferred methods of practiicng the same, it is to be distinctly understood that the invention is not limited thereto but may be otherwise variously embodied and practiced within the scope of the following claims.

I claim:

1. A tire having a tread design comprising a plurality of circumferentially extending spaced-apart ribs, said ribs defining circumferentially extending grooves therebetween, circumferentially continuous siping arrangements formed in at least some of said ribs, each of said siping arrangements being substantially sinusoidal and having portions which circumferentially overlap other connecting re-entrant sipe portions thereof.

2. The combination according to claim 1 wherein each of said siping arrangements includes a plurality of transversely extending sipes extending respectively from points in each of said siping arrangements which are adjacent said overlapping portions to an adjacent one of said grooves.

3. A tire having a tire tread comprising a plurality of circumferentially extending substantially continuous ribs, said ribs being spaced to define a number of circumferentially extending grooves disposed respectively therebetween, a siping arrangement formed in each of at least some of said ribs and co-extending therewith, said siping arrangements each including a series of closely spaced arcuate sipes, said sipes being partially overlapping in the circumferential direction, each of said siping arrangements including a plurality of transversely extending sipes extending respectively from said arcuate sipes to an adjacent one of said grooves, the walls of said grooves being extended slightly inwardly of the grooves at the junctions of said transverse sipes therewith to lengthen the associated anti-skid asperities.

4. The combination according to claim 3 wherein said groove walls are peaked inwardly at the junctions of said grooves with said transverse sipes to sharpen the adjacent end portions of the asperities formed by said transverse sipes.

5. A tire having a tire tread comprising a plurality of circumferentially extending substantially continuous ribs, said ribs being spaced to define a number of circumferentially extending grooves disposed respectively therebetween, a siping arrangement formed in each of at least some of said ribs and co-extending therewith, said siping arrangements each including a series of closely spaced arcuate sipes, said sipes being partially overlapping in the circumferential direction, a plurality of connecting sipes joining the adjacent ends of said arcuate sipes respectively.

6. The combination according to claim 5 wherein said connecting sipes are each disposed to define a pair of relatively reversely directed asperities for enhancing the anti-skid and anti-hydroplaning characteristics of said tire.

7. The combination according to claim 5 wherein said connecting sipes and the adjacent portions of said reversely curved sipes are disposed to define respectively associated pairs of relatively reversely directed arcuate asperities for enhancing anti-skid and anti-hydroplaning characteristics of said tire.

8. The combination according to claim 5 wherein said connecting sipes are of arcuate configuration.

9. The combination according to claim 5 wherein each of said siping arrangements includes a plurality of transversely extending sipes extending respectively from said arcuate sipes to an adjacent one of said grooves.

10. The combination according to claim 7 wherein each of said siping arrangements includes a plurality of transversely extending sipes extending respectively from said arcuate sipes to an adjacent one of said grooves for enhancing the anti-hydroplaning characteristics of said tire.

11. A tire having a tire tread comprising a plurality of circumferentially extending substantially continuous ribs, said ribs being spaced to define a number of circumferentially extending grooves disposed respectively therebetween, a siping arrangement formed in each of at least some of said ribs and co-extending therewith, said siping arrangements each including a series of closely spaced arcuate sipes, said sipes being partially overlapping in the circumferential direction, a central one of said ribs being substantially wider than the remainder of said ribs and, a pair of said siping arrangements being formed at laterally spaced locations in said central rib.

12. The combination according to claim 11 wherein the sipes of at least those siping arrangements on said central rib are each provided with a transverse sipe extending therefrom to the adjacent one of said circumferential grooves.

References Cited

UNITED STATES PATENTS

| | | | |
|---|---|---|---|
| D. 169,914 | 6/1953 | Roberts | 152—209X |
| 2,926,715 | 3/1960 | Constantakis | 152—209 |
| 3,012,599 | 12/1961 | Benson et al. | 152—209 |
| 3,185,199 | 5/1965 | Klingemann et al. | 152—209 |

ARTHUR L. LA POINT, *Primary Examiner.*

C. B. LYON, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,751                          September 24, 1968

Joseph N. Jacobs

It is certified that error appears in the above identified patent and that said Letters Patent are hereby corrected as shown below:

Column 2, line 42, "antihyroplaning" should read -- anti-hydroplaning --. Column 3, line 8, "continuously about the outer periphery" should read -- and desirably the ribs and grooves are --; line 9, "ranged" should read -- arranged --. Column 5, line 51, "practiicng" should read -- practicing --.

Signed and sealed this 27th day of January 1970.

(SEAL)
Attest:

Edward M. Fletcher, Jr.                        WILLIAM E. SCHUYLER, JR.
Attesting Officer                                  Commissioner of Patents